Sept. 21, 1971  B. F. TOBIN III, ET AL  3,606,897
APPARATUS FOR CLEANING OF CANISTER TYPE AIR FILTERS
Filed Jan. 26, 1970  5 Sheets-Sheet 1
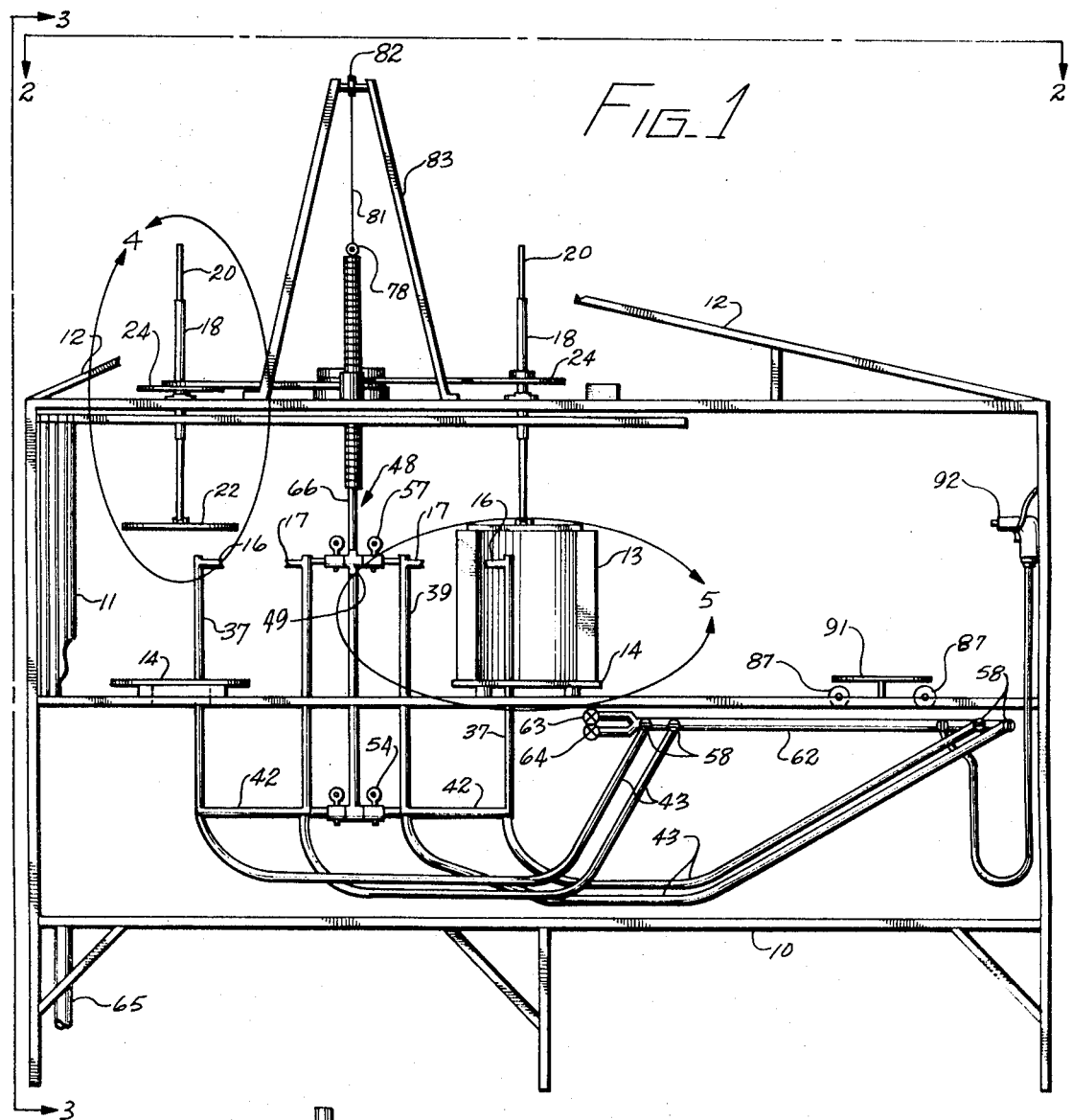
FIG_1
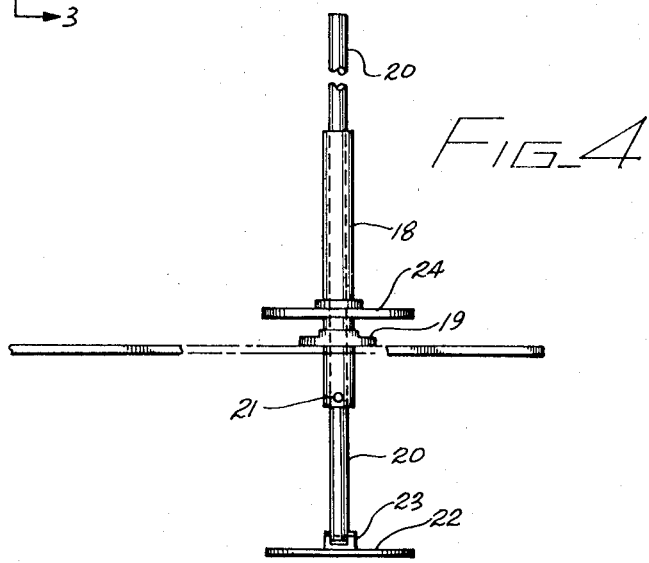
FIG_4
INVENTOR
BENJAMIN F. TOBIN III
MILTON J. HARRIS
BY
Christie, Parker, & Hale.
ATTORNEYS

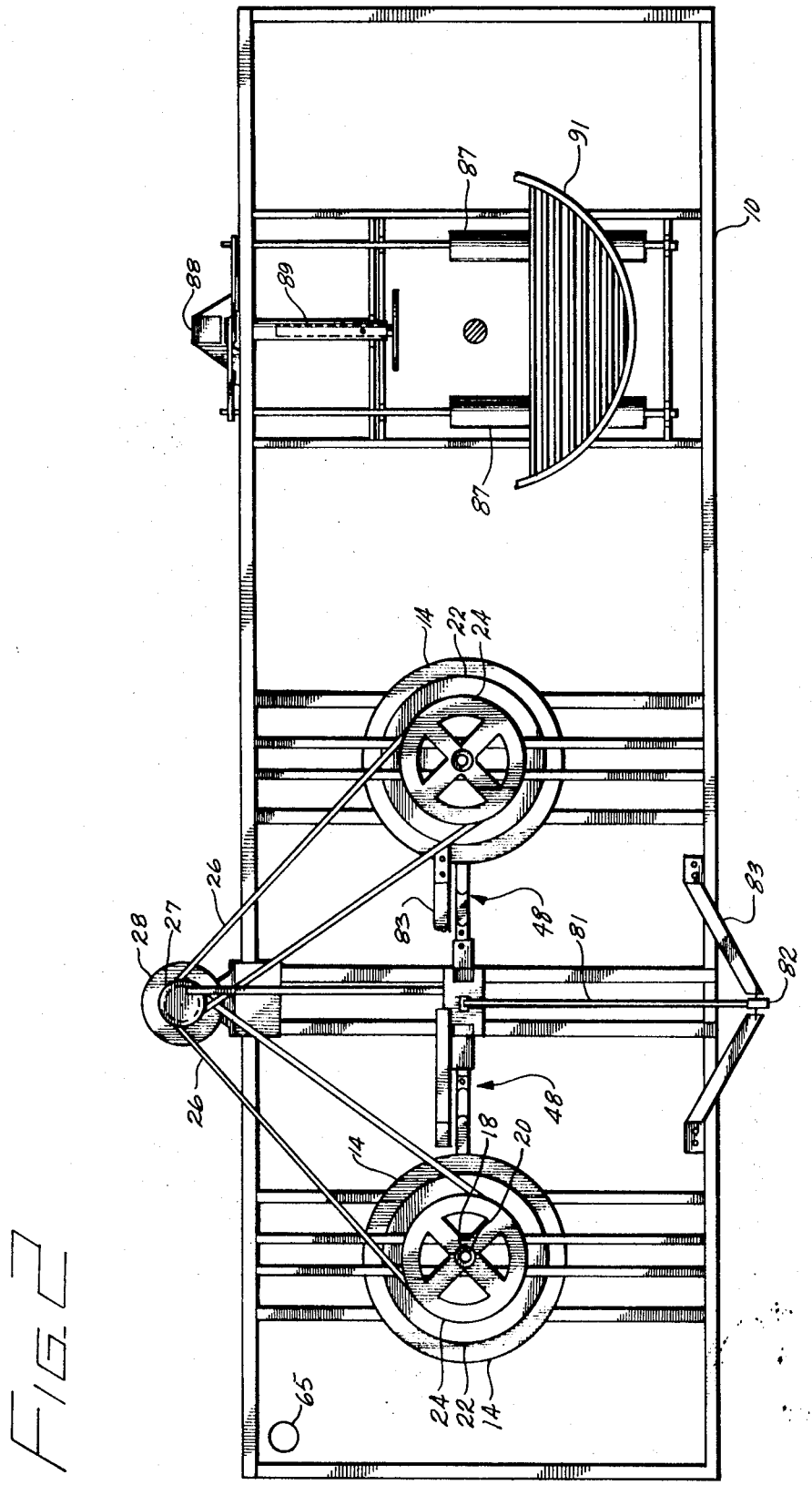

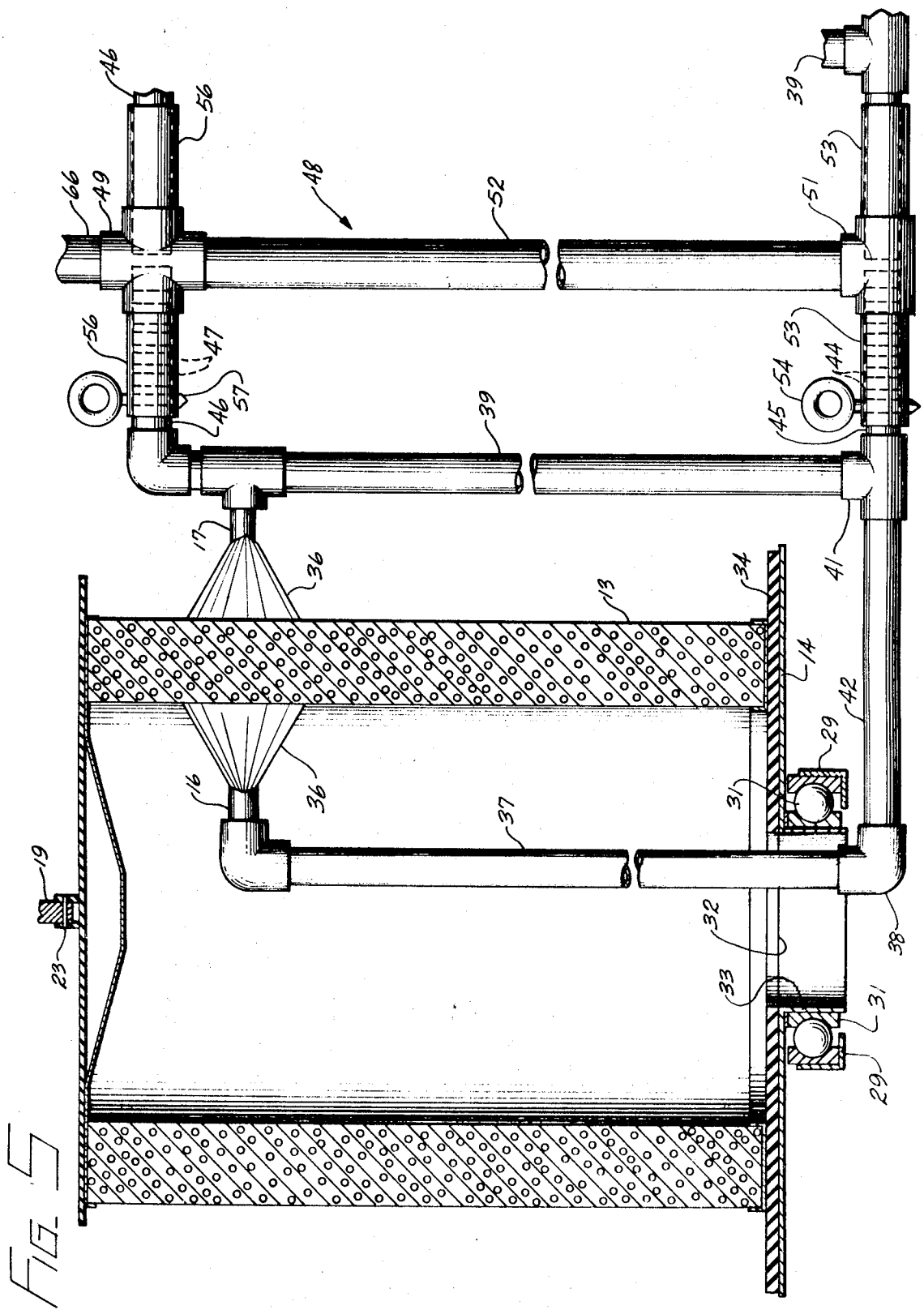

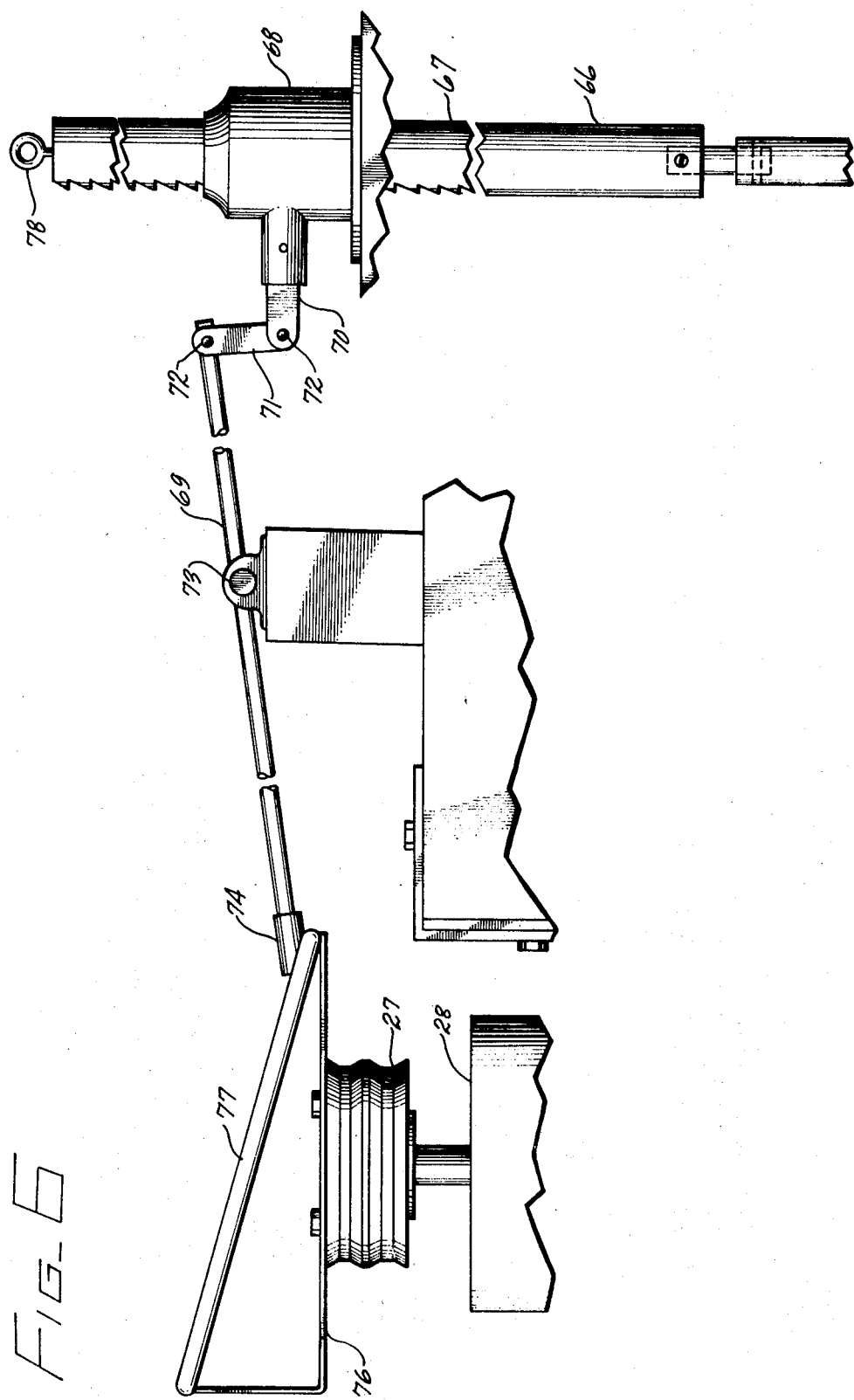

United States Patent Office 3,606,897
Patented Sept. 21, 1971

3,606,897
APPARATUS FOR CLEANING OF CANISTER TYPE AIR FILTERS
Benjamin F. Tobin III, 10545 W. Loyola Drive, Los Altos, Calif. 94022, and Milton J. Harris, 12414 E. Howard, Whittier, Calif. 90601
Filed Jan. 26, 1970, Ser. No. 5,546
Int. Cl. B08b 3/02, 9/00
U.S. Cl. 134—86    12 Claims

ABSTRACT OF THE DISCLOSURE

Apparatus for washing hollow cylindrical engine air cleaners or filter elements on inside and outside surfaces simultaneously and while the filter is in a vertical orientation. A pair of washing stations are provided, each with a centrally apertured turntable on which the filter element is placed for rotation about a vertical axis. Spray nozzles inside and outside the filter element wash a portion of the length with a fan shaped spray of cleaning liquid, and as the filter rotates, the sprays progressively move downwardly together along the length of the filter for thoroughly and uniformly washing the entire length of the filter. The length of travel and the radial position of the spray nozzles relative to the turntable are variable for accommodating different lengths and diameters of filters. A pair of cleaning stations are provided in a preferred embodiment so that a balanced spray nozzle assembly can be translated along the length of the filters by a simple ratchet mechanism. A station may also be provided for manual inspection and cleaning of air filters.

BACKGROUND

Heavy trucks, earthmovers and similar off-the-road equipment customarily include a large air filter for removing dust from the air intake to the engine, thereby protecting the engine. Such air cleaners commonly involve canisters in which a pleated paper air filter element is positioned so that the intake air to the engine is passed through the porous paper of the filter. Any dirt, grit or other foreign material is caught by the filter while the air passes so that it is prevented from entering the engine. When these filters have accumulated a substantial layer of dust, dirt and other debris, sometimes including oily material, they are removed from the canister and either discarded or cleaned.

In recent years, such cylindrical pleated paper filters have been made of resin impregnated paper which can be washed in order to remove accumulated dirt and debris so that the filter element can be reused many times, thereby effecting a very substantial cost saving without significantly decreasing the filtering efficiency of the air filter. Manual washing of the air filters involves a substantial amount of labor and is not customarily economical. Mechanical devices have been devised for cleaning filters; however, these have not proved satisfactory since they do not adequately clean the filters and manual finishing is usually required. In the best known apparatus for washing filters, approximately 40 filter elements per day could be washed sufficiently for reuse. Any substantial increase in the speed of cleaning with as good or better performance than existing machinery would substantially reduce the cost of cleaning and enhance the desirability of cleaning rather than discarding used air filter elements.

BRIEF SUMMARY OF THE INVENTION

Thus, in practice of this invention according to a preferred embodiment, there is provided means for rotating an air filter element or the like about its own axis while that axis is oriented in a vertical direction. Means are provided for spraying a portion of the length of the filter, both on the inside and the outside, with a cleaning liquid while the filter is rotating, and means are provided for translating the spray means vertically together along the entire length of the filter while it is rotating.

DRAWINGS

Other features and advantages of the present invention will be apparent from the following detailed description of a presently preferred embodiment when considered in connection with the accompanying drawings wherein:

FIG. 1 is a front view of a filter washing apparatus constructed according to principles of this invention, with side panels removed to better illustrate the internal mechanisms;

FIG. 2 is a top view of the apparatus of FIG. 1;

FIG. 4 is a detail of means for holding an air filter in position and rotating it about a vertical axis;

FIG. 5 illustrates a spray nozzle arrangement for the apparatus of FIG. 1; and

FIG. 6 illustrates a ratchet mechanism for translating the spray elements of FIG. 5.

Throughout the drawings like reference numerals refer to like parts.

DESCRIPTION

Figure 3:
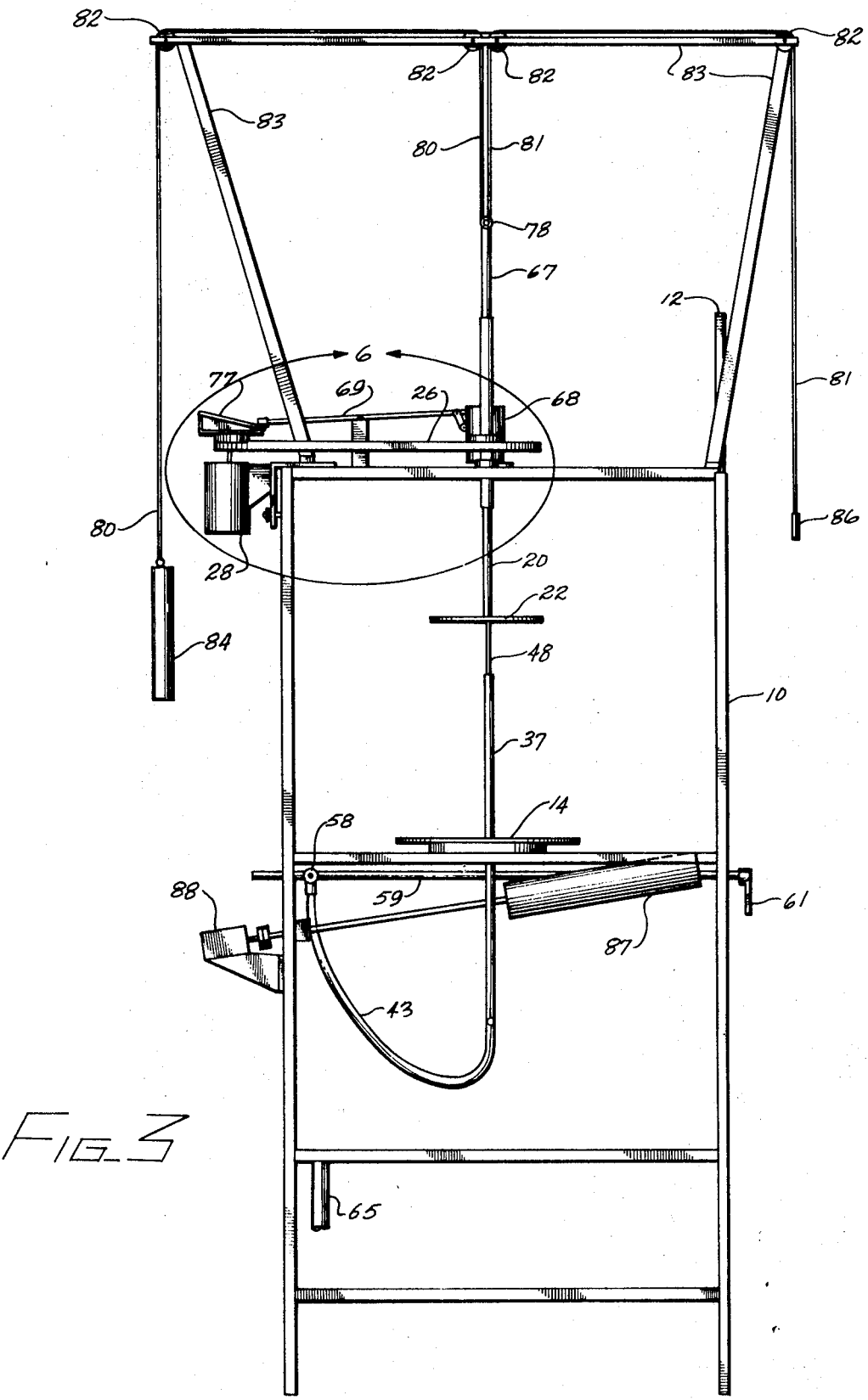
FIG. 3 is an end view of the apparatus of FIG. 1.

FIGS. 1, 2 and 3 illustrate in front, top and end views, respectively, an air filter washing apparatus constructed according to principles of this invention. In these drawings sheet metal panels surrounding and forming sides of the apparatus have been deleted in order to illustrate the operating mechanisms, and it will be apparent that any appropriate paneling, shielding and the like can be provided to contain water and cleaning solutions sprayed about within the apparatus. The omitted metal side panels are connected to an apparatus frame 10 which is conveniently welded together from angle iron and the like. A slidable transparent curtain 11 is provided across an open front portion of the apparatus so that it can be pushed to one side for loading and unloading filters and drawn across the front of the apparatus during use to prevent splashing water from leaving the apparatus. Any other closure desired may be used, such as doors or the like. A truss-like stiffening frame 12 is provided over the top of the broad front opening of the apparatus since this portion of the top is not sufficiently supported by the sheet metal sides.

Rather generally speaking, an air filter element 13 is mounted with its axis vertical on a horizontal turntable 14 so that the hollow cylindrical air filter can be rotated about the vertical axis. In FIG. 1 an air filter element 13 is illustrated in cross section on one of the two turntables 14. A inside spray nozzle 16 and an outside spray nozzle 17 are arranged opposite each other on opposite sides of the wall of the air filter 13 so that spray from the nozzles 16 and 17 impinges on both the inside and outside surfaces, respectively, of the air filter while it is rotating on the turntable 14. The spray nozzles 16 and 17 are mounted for vertical translation so that during normal operation spraying is commenced at the top of the filter and progressively the spray nozzles traverse downwardly along the filter to spray the entire length with a cleaning solution or rinse water.

The filter is caused to rotate by a motor driven clamping mechanism best seen in FIGS. 1, 3 and 4. This mechanism includes a sleeve 18 mounted in a bearing 19 on the top of the cabinet of the washing apparatus directly above each turntable 14. A shaft 20 is mounted within the sleeve 18 for vertical translation and is held in position by a set screw 21 which is preferably provided with a T handle (not shown) or the like so that it can be readily and quickly released and tightened. On the lower end of the shaft 20 a broad, stiff circular rubber pad 22 is mounted by a transverse pin 23 so that the pad 22 has some ability to tilt.

A pulley 24 is fixed to the sleeve 18 and a conventional drive belt 26 extends between the pulley 24 and a pulley 27 on a drive motor 28. In a preferred arrangement a pair of washing stations are provided and two such holding and driving mechanisms are provided as is readily seen in the top view of FIG. 2.

During operation, the motor 28 rotates thereby driving the pulley 24 which is fixed to the sleeve 18. Rotation of the sleeve also rotates the shaft 20 when the set screw 21 is tightened, and the rubber pad 22 is thereby rotated for engaging the top of a filter 13 on the turntable 14 so that the filter and turntable are thereby rotated. By providing the drive at the top and an idler turntable at the bottom, problems of wear in the drive mechanisms are avoided.

A typical turntable suitable for use in practice of this invention is illustrated in greater detail in FIG. 5, which shows one of the filter cleaning stations. As illustrated therein, a pair of angles 29 extending between the front and the back of the frame (not shown) support the outer race of a conventional ball bearing 31. The turntable 14 is mounted on the inner race of the ball bearing 31 and includes a central aperture 32 defined by a depending flange 33 which helps prevent water from entering the ball bearings. A soft rubber pad 34 on the turntable 14 provides a resilient support for the bottom portion of the air filter element 13.

The inside and outside spray nozzles 16 and 17, respectively, are also illustrated in FIG. 5, and it is preferred that these spray nozzles each be of the type providing a fan-shaped spray 36 arranged to provide an area of spray impingement on the air filter element about ¼ to ½ inch wide and extending two or three inches along the length of the filter. Each spray nozzle is about two inches from the surface of the filter element. Such a spray arrangement does an excellent job of cleaning within the longitudinal pleats of the filter and provides a high pressure jetting action which readily removes dust, dirt and the like from the filter. By providing a fan-shaped spray from each nozzle an appreciable length of the air filter element is washed at all times so that as the sprays progressively move along the length of the filter, each increment of length is within the area of spray impingement several times. The length being washed is still short compared with the length of the filter element so that a hard jetting action is obtained. Previous apparatus employing fixed sprays for the entire length do not have enough force for washing very dirty filter elements.

The inner spray nozzle 16 is mounted on the upper end of a vertical pipe 37 extending down to a conventional side elbow 38. Similarly, the outside spray nozzle 17 is at the upper end of a vertical pipe 39 extending downward to a conventional side T 41. The T 41 and elbow 38 are interconnected by a horizontal bar or plugged pipe 42 so as to be held a fixed distance apart. Flexible hoses 43 (FIG. 1) are connected to the side elbow 38 and the side T 41 at each washing station for supplying water or cleaning solution to the spray nozzles 16 and 17. If desired a T and a cross can be substituted for the side elbow 38 and side T 41, respectively, however, the side fittings are preferred to provide clearance for the bases.

A mounting bar 45 having a series of transverse holes 44 is threaded into the side T 41 opposite to the bar 42. A similar mounting bar 46 having a series of transverse holes 47 is connected at the top of the pipe 39 so as to be parallel to the lower mounting bar 45. The parallel mounting bars 45 and 46 serve to support the spray nozzles 16 and 17 and their associated piping.

The mounting bars 45 and 46 are in turn connected to a central support column 48 which is also readily built of conventional pipe and fittings. Thus, a pipe cross 49 and a T 51 are connected at upper and lower ends, respectively, of a vertically extending pipe 52. A short length of pipe 53 is threaded into the cross bar of the T 51, and the short mounting bar 45 is slip-fitted therein. A pin 54 slides through a transverse hole (not shown) in the pipe and through one of the holes 44 in the mounting bar 45. In a similar manner, a short length of pipe 56 is threaded into each of the side openings of the cross 49 so that the upper mounting bar 46 slip fits therein. A pin 57 extends through a hole (not shown) in the pipe 56 and one of the holes 47 in the short mounting bar 46.

In the washing of air filter elements, several different sizes may be encountered, and it is desirable to have the inside spray nozzle 16 and outside spray nozzle 17 each spaced from the surface of the filter element at the same distance so that the force and areas of the opposed impinging sprays 36 are approximately equal. The mounting arrangement just described permits the radial position of the spray nozzles relative to the turntable 14 to be adjusted. Thus, for adjustment, the pins 54 and 57 are withdrawn and the mounting bars 45 and 46 adjusted laterally within the pipes 53 and 56, respectively, for shifting the entire spray assembly laterally. The pins 54 and 57 are then reinserted in holes 44 and 47, respectively, to hold the assembly in position during operation. It is preferred to position the spray bars at the two stations the same lateral distance to maintain the support assembly 48 in balance.

In conventional practice, the air filter elements are uniformly of two-inch thickness, that is, the pleats are two inches deep, but may have substantially varying diameters and lengths depending on the equipment with which they are to be used. By providing the spray nozzles a fixed distance apart as determined by the bar 42, and making the entire assembly shiftable laterally, the inside and outside spray nozzles can be maintained a uniform distance on each side of the air filter element despite differences in filter diameter.

As mentioned briefly hereinabove, the spray nozzles are supplied with cleaning or rinsing solutions through flexible hoses 43. The hoses have sufficient length to accommodate vertical translation of the spray bars during operation of machine as hereinafter described, and their opposite ends are connected to a series of quarter-turn valves 58 positioned at the rear of the filter washing apparatus. An elongated bar 59 (FIG. 3) extends from each valve 58 to a handle 61 at the front of the apparatus for manual operation. It is preferred to employ valves 58 at the rear of the apparatus since after prolonged use some leakage of these valves may occur and can be tolerated since it does not strike the operator in front of the machine. The several valves 58 are connected to a fluid manifold 62 which is, in turn, connected to a cold clear water valve 63 for rinsing and a hot soapy water valve 64 for washing filters. The selection of hot and cold water is controlled by the manual valves 63 and 64 to which cold water and hot soapy water are provided in a conventional manner. The supply valves 63 and 64 are also preferably at the rear of the apparatus and operated from the front to protect the operator. It is of more interest that these manifold valves be at the back since these are the ones found to leak more often. A drain 65 in the pan at the bottom of the apparatus carries dirty water to waste.

In order to translate the spray bar assembly 48 in a vertical direction, a rod 66 is threaded into the upper end of the cross 49 (FIGS. 1 and 4) and the upper end of the rod 66 is connected to a linear ratchet 67. As seen more clearly in FIG. 6 a conventional ratchet operator 68 mounted on the top of the filter washing apparatus provides support for the ratchet and the spray bar arrangement connected thereto. A very simple ratchet and ratchet operator has been found to be a conventional automobile bumper jack operated in its conventional manner.

In order to operate the ratchet, a rod 69 is connected to the operating lever 70 of the jack by a link 71 pivotally connected at both ends by pivots 72. The rod 69 is supported between its ends by a pivot 73, and a roller 74 is provided on the end of the rod opposite from the operating lever 70. Mounted on the top of the pulley 27 connected to the motor 28 that drives the turntables there is an L-shaped bracket 76 with a circular hoop 77 mounted thereon so as to be in a plane tilted relative to a normal to the motor axis. In this way, as the motor causes the pulleys 27 to rotate, the hoop 77 also rotates, thereby serving as a cam to make the roller 74 at the end of the rod 69 rise and fall once for each revolution of the hoop. This rise and fall is translated to the operating lever 70 of the ratchet operator 68 by the link 71 and the ratchet is thereby lowered one-tooth length each revolution of the motor. In a typical embodiment the filter element is rotated at a rate of one revolution every ten seconds and the spray heads drop approximately one inch per three revolutions.

Referring again to FIGS. 1 and 3 an eye 78 on the top of the linear ratchet 67 is connected to a pair of cables 80 and 81 which are lead over pulleys 82 supported on a frame 83 above the main body of the washing apparatus so as to hang down behind and in front of the apparatus, respectively (the rear portion of the frame 83 and cable 80 are deleted from FIG. 2 for clarity of underlying parts). A counterweight 84 is connected to the rear cable 80 for counterbalancing a principal portion of the weight of the spray bar assembly at the air filter washing stations. The weight 84 is less than the full weight of the spray bar assembly so that it is biased downwardly by gravity. The other cable 81 depending in front of the apparatus has a handle 86 for use by the machine operator.

At the start of a washing cycle, the operator pulls downwardly on the handle 86 which raises the linear ratchet 67 in the ratchet operator 68 and brings the entire spray assembly to the top part of the filter. When the handle 86 is released, while the motor 28 is running, the ratchet gradually and progressively lowers the spray assembly so that the spray nozzles 16 and 17 progress downwardly along the extent of the filter for thorough cleaning of the entire length. Since the stroke of the spray assembly is only along the length of the filter in place on the turntable, water is not uselessly sprayed when a short filter element is being cleaned. Previously fixed length spray bars were needed of sufficient length to accommodate the longest filters anticipated and much water was needlessly used when shorter filters were washed. About ⅓ as much soap is used as in prior apparatus.

In the normal course of operation of the apparatus, a filter element 13 is placed on one or both of the turntables 14 and the rubber pad 22 is lowered into position to firmly hold the filter element in place. Thereupon, the set screw 21 is tightened for holding the pad down and causing the shaft 19 to rotate with the sleeve 18. The curtain 11 is then closed and the motor 28 started so that the filter element commences to rotate as drive by the belts 26. The operator then turns on the hot soapy water or other cleansolution to the inside and outside sprays 16 and 17, respectively. He then pulls on the handle 86 to raise the ratchet 67 and spray bar assembly to a point where the spray nozzles are adjacent the top of the filter element mounted on the turntable. It has been preferred to manually hold the spray assembly in position at the top for a brief interval since it is usual that the ends of the filter element are the dirtiest and a slightly longer cleaning time is desirable.

After a brief dwell at the top, the handle 86 is released and the ratchet, as actuated by the hoop 77 and rod 69, progressively lowers the spray assembly along the length of the filter. When this assembly reaches the bottom it is permitted to dwell for a short period to provide additional cleaning action at the lower end of the filter, and then the operator turns off the hot soapy water and applies cold clear water as a rinse. The handle 86 is again pulled to raise the ratchet and spray assembly to the top and the ratchet is then again permitted to lower the assembly along the length of the filter. A dwell is not employed at the top during the rinsing operation. When the spray assembly reaches the bottom in the rinsing operation, the rinse water and the motor 28 are turned off and the pad 22 released so that the filter elements can be removed from the turntables. For particularly dusty filters, a cold rinse can be used prior to the hot washing cycle if desired.

When the air filter element is removed from the table 14 it is placed on a pair of parallel rollers 87 (FIGS. 2 and 3) which are rotated by a motor 88 at the rear of the apparatus. The rollers 87 are tilted so the forward ends are higher than the rearward ends and an adjustable stop 89 is provided behind the sloping rollers to keep the air filter element from sliding too far rearwardly. While in place on the rollers 87, the air filter element is manually inspected for tears, breaks or holes in the paper which would pass dust to the engine. If upon manual inspection a remaining dirty area is noted, a circular removable grill 91 which can conveniently be an ordinary barbecue grill is placed in position over the rollers 87 so that the air filter element can be set thereon and spot cleaned with a hand-operated nozzle 92. This grill is also useful for manual cleaning of the approximately 4% of existing filter types that do not provide acces for a central spray nozzle and are, therefore, usually cleaned manually.

The hand operated noozle 92 is employed for inspection as well as spot cleaning of the filters after the automatic cleaning steps. The hand nozzle is preferably a pistol grip type of unit with a hand-operated valve and has a large forceful flow of water heavily aerated with entrained bubbles of air. This is to be contrasted with a fine needle-like spray or a single hard jet of water. A forceful flow of relatively large volume is desired in order to force water through any apertures in the filter and also to effect spot cleaning where required. The heavy aeration to provide a large number of bubbles within the flow of water is desired for inspection purposes.

Inspection with the hand nozzle 92 is normally conducted in three stages. The first stage involves forward flow of water from the dirty side of the filter towards the clean side, that is, with the flow of water from the hand nozzle impinging on the normally dirty side of the filter. The water coming through to the normally clean side of the filter should be clear to indicate an adequately clean filter. The second stage of testing is a reverse flush where the stream of water from the hand nozzle is directed against the normally clean side of the filter and the water on the normally dirty side should also be clear to indicate proper cleaning.

The third stage of testing is to test for tears, separations in the bond, or the like, at the ends of the filter. This is of particular importance since in the normal course of testing the filters by viewing them in intense light, leaks at the ends can easily be overlooked or not seen at all under the best of conditions. In visual inspection any obvious holes in the filter element can be seen by the operator when the filter element is illuminated with bright light from one side and any tears, perforations, or the like, show up as a bright spot. Leaks at the ends of the filter are common since at the ends the paper filter element is sealed to the metal ends and this seal can be broken if the filter element is dropped or if the filter has been used under adverse conditions that may cause cracking of the sealing material. Sometimes poorly sealed areas are found due to manufacturers' faults and in other instances the seal separates from the metal ends in use. Such leakage at the ends is not readily determined with light inspection.

In order to find the end leaks, the filter is laid on the rollers 87 and the hand gun 92 with a full flow of aerated water is held in one position to direct the flow against the filter element as the filter rotates. In a sound filter having no holes, tears or petforations, the wet paper forming the filtering material prevents the passage of air due to the surface tension forces of the liquid within the porous paper. Water may flow through the porous paper but air will not when it is wet. If, on the other hand, there is a hole, the force of aerated water against the paper causes bubbles of air to pass through the hole and these bubbles are readily seen on the reverse side of the filter. Thus, as the hand nozzle scans around the end of the filter rotating on the rollers, the heavily aerated forceful flow of water passes water through a sound filter but causes a stream of air bubbles within the water to be seen at any leaks through the filter. This has been found to be an excellent inspection technique for identifying filters having leaky elements.

By using an aerated flow of water against the filter after cleaning in the automatic station, any leaks in the filter can be detected at an early stage before all of the cleaning operations have been completed. After washing the filters in the disclosed apparatus they are dried for many hours at low temperature in a forced drying oven for complete drying without damaging the resins in the paper. After prolonged drying, the filters are inspected with bright lights for holes or tears. By detecting such holes or tears immediately after washing, the filter can be immediately discarded instead of going through the drying and subsequent inspection cycles, thereby effecting a substantial saving of time and effort.

It is found in operating a unit as hereinabove described that the manual inspection, and spot cleaning if needed, of a pair of air filter elements can be readily completed while another pair is being automatically cleaned in the two cleaning stations. Thus, only a single operator is required with the apparatus. With such an arrangement, ten to twelve air filter elements can be cleaned per hour as compared with about five per hour with the best previous cleaning apparatus. In addition, since the inside and outside sprays impinge on only a limited area during cleaning, a relatively high pressure can be maintained and the filter elements are cleaner after automatic operation than in the previous apparatus and appreciably less manual spot cleaning is required.

An additional advantage is obtained by orienting the axis of the filters in a vertical direction since the cleaning solution carrying the dirt flows downwardly through the opening 32 in the turntable and out of the filter element, carrying the dirt with it. In prior arrangements, filters have been placed on their sides and rotated about an axis sloping relative to the horizontal so that dirty water could be trapped within the filter element and cleaning was thereby hindered.

Drying of washed filters is conducted in a low temperature oven in a conventional manner and forms no part of this invention.

Although but a single embodiment of an apparatus for washing air filter elements has been described and illustrated herein, it will be readily understood that many modifications and variations of the present invention can be made by one skilled in the art. Thus, for example, other mechanisms can be employed for traversing the spray assembly vertically along the length of the filter during the washing cycle and the sprays can be automatically turned off at the bottom of the stroke if desired. A significant variety of other detailed mechanical arrangements for holding and rotating the filter elements can be provided.

An additional possible modification is the mounting of a washing spray head and a rinsing spray head on the same support on both the inside and outside so that each area of the filter is successively contacted with a spray of cleaning solution and a spray of rinsing solution as it rotates. In this manner a single traverse along the length would be effective for washing and rinsing. It will also be apparent that additional cleaning stations can be provided in an apparatus for a higher rate of production and many other variations will be apparent.

What is claimed is:
1. An apparatus for washing hollow cylindrical air filters or the like comprising:
   means for rotating a filter about a vertical axis and about its own axis;
   first means for spraying a portion of the length of the inside surface of the filter with a cleaning liquid while the filter is rotating;
   second means rigidly connected to the first means for spraying, for spraying a portion of the length of the outside surface of the filter opposed to the inside portion being sprayed, and wherein each of the means for spraying comprises a nozzle means for directing an elongated or fan-shaped spray of cleaning liquid and with the greatest extent of the elongated spray being aligned in a vertical direction;
   means for translating the first and second means for spraying vertically downwardly together along the length of the filter gradually in coordination with rotation of the filter for washing the entire length of the filter;
   means for adjusting the first and second means for spraying in a horizontal direction for washing filters having different selected diameters; and
   means for adjusting the means for translating for washing filters having different selected lengths.
2. An apparatus as defined in claim 1 wherein:
   the means for rotating comprises an annular turntable for supporting the lower end of the filter, and means for engaging the top end of the filter in driving engagement;
   the lower end of the filter is open for discharging liquid; and wherein
   the first spraying means enters the filter through the lower end.
3. An apparatus for washing air filters as defined in claim 1, further comprising:
   a filter inspection station comprising a pair of almost horizontal, parallel, spaced apart rollers;
   means for rotating at least one of the rollers; and
   means for directing a flow of water having a large number of bubbles of air entrained in the water against a surface of the air filter.
4. An apparatus for washing hollow cylindrical air filters or the like comprising:
   means for rotating a filter about a vertical axis and about its own axis;
   first means for spraying a portion of the length of the inside surface of the filter with a cleaning liquid while the filter is rotating;
   second means for spraying a portion of the length of the outside surface of the filter opposed to the inside portion being sprayed;
   a ratchet connected to the means for spraying;
   a fixed ratchet operator; and
   an operating lever connected to the ratchet operator; and
   cam means connected to the means for rotating the filter for operating the ratchet operator,
   for translating the first and second means for spraying vertically together while the filter is rotating for washing the entire length of the filter.
5. Apparatus for washing hollow cylindrical air filters or the like comprising:
   a turntable having an upwardly facing horizontal filter receiving surface and a central aperture through the filter receiving surface;
   means for supporting the turntable for rotation about a vertical axis;
   means for holding a filter in engagement with the filter receiving surface comprising a filter engaging member resiliently biased downwardly against a filter in engagement with the filter receiving surface, and means for vertically translating the engaging member for selectively engaging or disengaging a filter;
   means for rotating a filter in engagement with the filter receiving surface comprising drive means for the engaging member, and means for advancing the means for translating said engaging member in response to the means for rotating;

first spray means aligned for directing a spray of cleaning liquid against the inside of a filter in engagement with the filter receiving surface, and including a portion extending through the central aperture of the turntable;

second spray means aligned with and opposed to the first spray means for directing a spray of cleaning liquid against the outside of a filter in engagement with the filter receiving surface; and means for translating the first and second spray means vertically in synchronism with each other.

6. Apparatus as defined in claim 5 wherein the first and second spray means each comprises a nozzle directing a fan-shaped spray against a filter in engagement with the filter receiving surface, the greater extent of the fan-shaped spray extending in a substantially vertical direction.

7. Apparatus as defined in claim 5 wherein the first spray means is rigidly interconnected to the second spray means and further comprising:

means for adjusting the interconnected spray means in a horizontal direction for washing filters having diameters in a preselected range.

8. A pair of substantially identical apparatus as defined in claim 7 in side-by-side relation and wherein the means for translating is the same for both apparatus and is intermediate therebetween for translating the first and second spray means of both apparatus in synchronism with each other.

9. Apparatus for washing hollow cylindrical air filters or the like comprising:

a turntable having a horizontal filter receiving surface and means for passing liquid through the filter receiving surface;

means for supporting the turntable for rotation about a vertical axis;

means for holding a filter in engagement with the filter receiving surface;

means for rotating a filter in engagement with the filter receiving surface;

first spray means aligned for directing a spray of cleaning liquid against the inside of a filter in engagement with the filter receiving surface;

second spray means aligned with and opposed to the first spray means for directing a spray of cleaning liquid against the outside of a filter in engagement with the filter receiving surface; and means for translating the first and second spray means vertically in synchronism with each other comprising:

a ratchet connected to the first and second spray means;

a fixed ratchet operator; and means for operating the ratchet operator in response to the means for rotating.

10. Apparatus as defined in claim 9 wherein the spray means translate from top to bottom of a filter in engagement with the filter receiving surface in response to operation of the ratchet and further comprising:

means for manually overriding the means for translating for holding the spray means opposite the ends of a filter for a preselected time.

11. Apparatus for washing hollow cylindrical air filters or the like comprising:

a cabinet;

a pair of filter washing stations within the cabinet, each of the filter washing stations comprising:

a turntable having an upwardly facing horizontally disposed filter receiving surface and a central aperture through the filter receiving surface;

means for mounting the turntable for rotation about a vertical axis;

a vertically adjustable, downwardly facing filter engaging member opposed to the filter receiving surface on the turntable; and a spray bar assembly including a first spray means extending through the central aperture of the turntable and aligned for directing a spray of cleaning liquid against the inside of a filter in engagement with the filter receiving surface, and a second spray means aligned with and opposed to the first spray means for directing a spray of cleaning liquid against the outside of a filter in engagement with the filter receiving surface;

means for supplying cleaning liquid to the spray assembly of each of the cleaning stations;

a vertically extending support column;

means for mounting the spray bar assembly of each of the cleaning stations on the support column on opposite sides thereof including means for horizontally adjusting each spray bar assembly for accommodating filters of different selected diameters;

means for rotating the filter engaging member of each cleaning station for rotating a filter in each station about a vertical axis;

means for raising the support column so that the spray means direct a spray of cleaning liquid against the upper portion of a filter in each cleaning station; and means for gradually traversing the support column downwardly along the length of the filters.

12. An apparatus as defined in claim 11 wherein the means for raising and gradually lowering comprises a linear ratchet connected to the support column;

hand operated means for raising the ratchet and overriding its downward traverse; and means for operating said ratchet for lowering the support column gradually in coordination with rotation of the filters.

References Cited

UNITED STATES PATENTS

| | | | |
|---|---|---|---|
| 3,216,429 | 11/1965 | Dick | 134—102 |
| 3,526,237 | 9/1970 | Neill, Jr. | 134—152X |
| 3,062,227 | 11/1962 | Soderberg | 134—170X |
| 3,104,407 | 9/1963 | Volk | 134—168X |
| 3,236,249 | 2/1966 | Everroad | 134—167 |
| 3,442,273 | 5/1969 | Hanish et al. | 134—152X |
| 3,482,584 | 12/1969 | Schipke | 134—149X |

FOREIGN PATENTS

| | | | |
|---|---|---|---|
| 101,136 | 9/1923 | Switzerland | 134—86 |

ROBERT L. BLEUTGE, Primary Examiner

U.S. Cl. X.R.

134—88, 113, 144, 152, 170